Nov. 9, 1943.                D. F. SKLAR                2,333,747
                           HARDNESS TESTER
                    Filed July 18, 1941            2 Sheets-Sheet 1

Fig. 1.

INVENTOR,
DAVID F. SKLAR:
BY          Kilpatrick
                ATTORNEY

Nov. 9, 1943.   D. F. SKLAR   2,333,747
HARDNESS TESTER
Filed July 18, 1941   2 Sheets-Sheet 2

INVENTOR,
DAVID F. SKLAR
BY
ATTORNEY

Patented Nov. 9, 1943

2,333,747

UNITED STATES PATENT OFFICE 2,333,747

HARDNESS TESTER

David F. Sklar, Brooklyn, N. Y., assignor to Wilson Mechanical Instrument Co. Inc., New York, N. Y., a corporation of New York Application July 18, 1941, Serial No. 402,914

45 Claims. (Cl. 265—12)

This invention relates to hardness testing machines and apparatus and more particularly to improvements in machines of the general type shown in the Rockwell Patents Nos. 1,516,207 and 1,516,208, both issued November 18, 1924, and the Wilson Patent No. 1,885,972, issued November 1, 1932.

It is to be noted that testing machines of this type have been extensively used not merely for testing samples or specimens of material, but for testing actual working parts of machine tools, aircraft engines and the like in a non-destructive way. Many very small metal parts of computing machines, typewriters and much very thin sheet metal such as used in automobile fenders are required to be tested for hardness to determine their resistance to wear or impact or cold working characteristics. Where the piece to be tested is very small or very thin the indentation made by any indentation hardness test must be proportionately minute to accomplish measurement of hardness without damage to or ruination of the piece tested.

It is also to be noted that all of the patents above cited refer to testing machines wherein two standard loads are successively applied to indentors of standard shape, and measurement of hardness is obtained by linear measurement of increment of indentation due to increment from a load of minor value to a load of major value, thereby avoiding measurement of total depth of indentation and so avoiding the establishment of zero depth coincident with the surface of part tested, which in practice would be difficult because of roughness, in a microscopic sense, of the surface of the part tested which is often heat treated steel having rough machined or burned and scaled surface. It will also be noted that the initial or minor load in those machines is applied by compression of a spring while the final or major load is applied by a gravitational effect, and that the so-called hardness measurement is in reality simply a linear measurement of the movement of an indenting member acting under the increment of the indenting pressure.

In order that such increment of load may be a standardized value it is just as imperative that the initial load be of fixed value as that the final load be fixed. In the earlier machines referred to above the hand and eye of the operator control the value of the applied initial or minor load.

Also it is to be noted that in all of the testing machines described in those patents and in this application, the initial or minor load is applied by forcing the specimen against the indenter which is backed by a resilient load applying member, and that the forced motion of the indenter and its supporting rod is in a direction directly opposite to the direction of their later additional motion under application of the later and greater major load, during the application of which the specimen is stationary and must be stationary in the employed system of measuring the relative movement of the penetrator with respect to the main frame of the testing machine as a means of measuring an increment of indentation into the specimen.

In U. S. Patent 1,516,207, the earliest of the above mentioned patents, an arrangement is shown where compression of the minor load spring is largely accomplished before the sensitive feeler member of a stationary depth measuring gauge is engaged. Just as in the type of testing machine described in that patent, so do I find it desirable in the improved machine of this invention to provide alternately that the penetrator plunger system may be in positive and permanent engagement with the sensitive feeler of the stationary depth measuring indicator or may be free of such engagement until I provide means during the procedure of the test to make such engagement prior to the downward movement of the pressure plunger system toward the stationary specimen, which is accomplished by the falling dead weight of standardized value. Furthermore, I may substitute electro-magnetic means for the mere hand operated mechanical means for engaging the sensitive feeler of the stationary gauge with the pressure plunger system prior to its reversal of direction caused by the falling standardized major load weight.

One major object of this invention is to standardize the minor load by arresting the elevation of the indenter, which is caused by the elevation of the specimen, when the minor load applying spring is compressed a definite amount.

To this end a further object of the invention is to provide means for automatically stopping the elevating of the test specimen at an easily adjusted position at which the force of the minor load is a correct standard force, thereby eliminating need for the operator to observe the indicator for this initial setting.

Other objects of the invention are to provide improved means started by the operator for raising the specimen to the indentor, and to provide automatic means for operatively connecting the indicator gauge, at its proper initial setting, to the indentor member only after the indentor has been engaged and the minor load has been effectively applied and before the application of the major load.

Another object is to provide improved means whereby release of the starting means by the operator, after he has read the gauge indications, will restore the major load, disconnect the gauge from the indentor member, lower the test-specimen support and automatically stop it in a predetermined lowered position.

Additional objects of the invention are to effect simplicity and efficiency in automatic hardness testers and to provide an apparatus of this kind which is accurate, and reliable in operation, and easy to operate, and to provide electric control for the above operations.

Still other objects of the invention will appear as the description proceeds; and while herein automatic controls and other details of the invention are described in the specification and some of the claims, the invention as described in the broader claims is not limited to these, as various hand operated mechanisms may be used and many changes may be made without departing from the scope of the invention as claimed in the broader claims.

The inventive features for the accomplishment of these and other objects are shown herein in connection with a hardness tester which briefly stated, includes a test-specimen-support and an opposed loading indentor member pressed upon by a standardized minor load, and then by a major load to operate an indicating gauge. A drive means set in operation on the actuation of the main control lever or device operates to move the support and specimen toward the loading member until the latter is moved. A major load applying means is set in operation by the moved loading member to brake the support and then to apply and retract the major load. Means are provided to lock the loading member and the actuating part of the gauge together. Means set in operation by the main control lever or device when released effects movement of the test-support from the indentor member, and means actuated by the support automatically stops the last named movement at a predetermined adjusted position.

In the accompanying drawings showing, by way of example, one of many possible embodiments of the invention.

Figure 3:
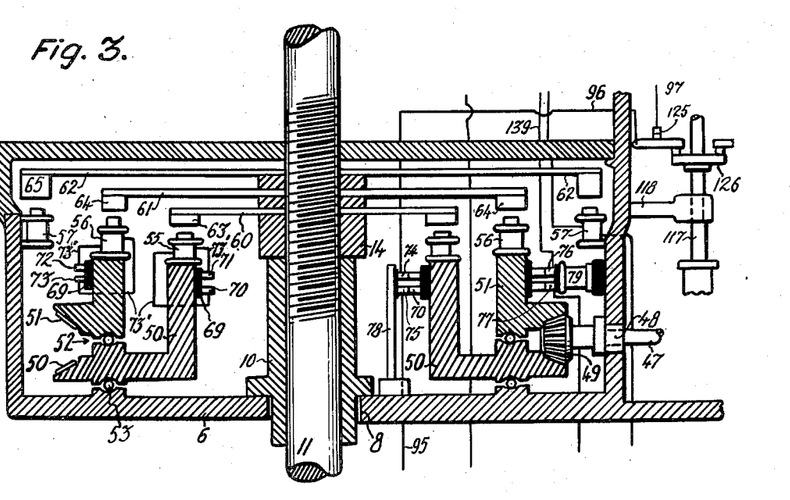
Fig. 3 is an enlarged vertical sectional view showing details of the braking means and means for raising and lowering the test piece.

The various parts of the hardness tester are carried by a housing or frame 5 having intermediate and upper horizontal partitions or floors 6 and 7 respectively provided, in vertical axial alinement, with a sleeve-receiving opening 8 and an upper conical seat opening 9. A bearing sleeve 10 (Fig. 3) in said sleeve opening 8 receives an elevating screw 11 slidable in the sleeve and adapted to receive the test piece 12 on the upper end. An elevating nut 14 receiving the screw rests on the sleeve, whereby on rotation of the nut the screw may be raised and lowered.

A loading rod or indentor-member 15 has an enlarged lower cylindrical portion 16 provided with a lower flange 17 having a conical seat face resting in said conical seat opening 9. Said member 15, has an engagement part, indentor or penetrator 18 on the lower end adapted to be engaged by said test specimen 12 when raised. A bracket 19 on the upper part of the housing wall has an opening for guiding the upper part of the loading rod 15. A helical minor load spring 20 rests on the seat flange 17 around the cylindrical portions 16; and a seating collar 21 loosely received on the loading rod above and spaced from the cylindrical portion 16 is provided with an upper end flange 22 engaged on the spring.

A power or major load lever 25, carrying the major load 26 at its free end, carries at its fulcrum end a knife-edge device 27 engaged with fulcrum means carried by the housing walls, the lever having near its fulcrum end an intermediate opening 28 through which the loading rod passes. Means later to be described are provided for holding the power lever raised and for lowering it when required. A tubular double-knife-edge member 29 disposed between the seating collar flange 22 and the power lever transmits pressure from the lever to the collar when the lever is lowered.

A control lever 30 pivoted as at 31 at its inner end in the upper part of the housing carries intermediately an adjustable stop screw 32 having a lower end recess receiving the upper pointed end 33 of the loading rod. An indicator actuating lever 35 upwardly biased by a spring 36 is pivoted coaxially with the control lever 30 and is connected at its free end with the actuating part 37 of an indicating dial gauge 38 mounted on the housing. A locking electro-magnet 39 and a flexibly mounted armature 40 are carried respectively on said levers 30 and 35, and when the magnet is energized (as will be explained) it will attract the armature 40 to locking engagement therewith, thereby to lock said levers together, thereby operatively connecting the gauge 38 to the loading rod 15 through the lever 30 and screw 32, whereupon penetrating movement of the loading rod will move the indicating pointer of the gauge.

A suitably slow motor 45, or motor with reducing gear, mounted on the rear part of said intermediate floor is controlled by a starting switch 46 and furnishes the power for raising and lowering the screw 11 and power lever 25 as will be explained. The shaft 47 of the motor extends toward the elevating screw 11 and rotates continuously during operation of the tester in a bearing 48 in the housing wall and is provided at the end nearest the screw with a miter pinion 49 meshing with a pair of superposed rotary ring gears 50, 51 coaxial with the elevating screw, the inner lower gear 50 being supported by ball-bearings 53 in an annular groove in the intermediate floor 6, the outer upper gear being supported by ball-bearings 52 on the lower gear, whereby as the shaft 47 rotates the ring gears rotate in opposite directions.

A series or set of elevating magnets 55 and a series or set of lowering or down-drive magnets 56 are mounted fast on the top face of the inner and outer gears and respectively, and a series set of braking magnets 57 are mounted on the housing wall around the revolvable magnets. Three spring disks or three sets of radial flat springs 60, 61, 62 are mounted fast on the elevating nut to revolve therewith, and respectively have at the peripheries or free ends armatures 63, 64, 65, the armatures of the respective sets being adapted to be attracted by and locked to the magnets 55, 56, 57 of the respective sets, whereby the elevating nut and screw will be locked against movement when the braking magnets 57 are energized, or moved in one direction or the other as one or the other series of revolving magnets 55 or 56 are energized.

Insulating collars 69 are respectively secured to the outer face of the outer ring gear and the inner face of the inner ring gear; and pairs of slip rings 70, 71 and 72, 73 carried on said collars respectively are respectively electrically connected by conductors 73' to ends of the magnet coils 55 and 56, all of the magnet coils of each set being suitably connected between the associated slip rings. Pairs of brushes 74, 75 and 76, 77 carried on brackets 78, 79 mounted on adjacent portions of the housing respectively engage the slip rings 70, 71 and 72, 73, whereby the revoluble magnets may be energized as will be explained.

After the motor has been started operation of the tester is controlled by a double-throw main or foot-switch 80 at the lower floor 81 of the housing comprising normally engaged and disengaged fixed contacts 82, 83, and a foot operated contact 84 biased by a spring 85 to the normally engaged contact, and movable by foot pressure on the lever 86 to the other contact 83. A control switch in the upper part of the housing comprises a pair of fixed contacts 88, 89 and a movable contact 90, the latter carried by an arm 91 of said control lever 30, and normally engaging the fixed contact 88 and movable therefrom to the other contact 89 when the elevating screw and test specimen have raised the loading rod 15 enough to flex the minor load spring 20, but before the gap 92 between the cylindrical portion 16 and the seating collar 21 is closed. Conductors 95, 96 (connected with brushes 75, 74), conductors 97, 98, 99 and current source 100 cooperate to provide a starting or elevating circuit connecting the normally disengaged contact 83 and movable element 84 of the foot switch in series with the elevating magnets 55 and associated brushes and slip rings and the normally engaged contact 88 of the control switch, whereby when the circuit is completed from pressure on the foot lever 86 the revoluble elevating magnets are energized and attract and lock the armatures 63 and raise the screw and test specimen, and then the loading rod 15 from its seat until the normally engaged control switch contact 88 is disengaged thereby to deenergize the magnets 55 and stop the raising of the specimen before the gap 92 is closed.

When the loading rod is thus raised sufficiently, conductors 98, 99, 105, 107 cooperate to provide a braking circuit connecting the normally disengaged control-switch contact 89 in circuit with the braking magnets 57 thereby attracting the armatures 65 and locking the nut 14 and screw 11 stationary. The stop screw 32 is so adjusted that the contact 90 is operated just as the compression of the spring 20 gives the required minor load for the particular kind of material or articles to be tested.

On said motor shaft is provided a magnetic clutch comprising a magnet carrying drive member 109 fast on the shaft and a driven clutch member 110 loose on the shaft and carrying a cam 111 and adapted to be locked to the driven member 109 when the clutch magnet is energized. Conductors 112, 113, current source 114 and the contacts 115 of a clutch control relay 116 having its magnet coil in the braking circuit, cooperate to provide a clutch circuit connecting the magnet coil of the clutch member 109 in series with the relay contacts 115 when the relay is energized when the minor load is applied, whereby the clutch is locked and the cam 111 starts to rotate, thus lowering a major-load control rod 117 vertically slidable in bearings 118, 119 carried by the housing and provided on its lower end with a cam follower 117' engaging the cam 111. The rod 117 engages under the power lever 25 which is normally held raised by this rod when the cam 111 is in normal position, but is lowered and again raised when the cam makes a complete rotation. When the power lever and major load are thus lowered, the gap 92 is closed and the seating collar 21 presses on the cylindrical portion 16, thus increasing the pressure and penetration of the indentor 18.

An upper switch 120 normally engaged and held open by an upper projection 121 on the control rod 117 when the rod is in raised position, is biased to closed position when the rod is lowered, thus completing an electric circuit 122, 123, 124 connecting the locking magnet 39 of the control lever 30 and said upper switch 120 in series, whereby when the major load begins to be applied, the magnet 39 is energized and the gauge 38, at the normal position of its pointer, is operatively locked to the loading rod 15 and indentor 18 as the major load begins to descend, but just before the gap 92 is closed, whereupon after the gap is closed, the gauge indicator moves as a function of the further penetrating movement of the indentor under continued application of the major load, as will be explained.

A normally closed switch 125 interposed in conductor 96, 97 of the elevating circuit, is biased to open position as soon as a lower projection 126 fast on the control rod starts downward. This breaks the elevating circuit to prevent further elevation of the test specimen. Said switch 125 is closed by the lower projection when the control rod and major load are again in raised position, to prepare the elevating circuit for another test.

Figure 4:
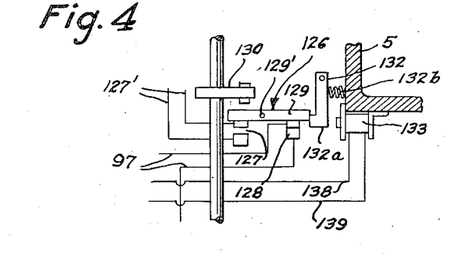
Fig. 4 is an enlarged elevation partly in section, showing means for holding the drive means inoperative when the major load is applied.

A double holding-switch generally denoted by 126' comprises a normally open switch 127 adapted (by conductors 127') when closed to shunt the upper switch 120, and a normally closed switch 128 interposed in conductor 97 of the elevating circuit, and a movable element 129 adapted, when the rod is lowered, to be engaged by an intermediate projection 130 on the rod 117 to close the normally open switch 127 and also to open the other switch 128 further to break the elevating circuit. A latch 132 of magnetic material pivoted at its upper end is provided at its lower end with a projecting portion 132a normally urged against the adjacent end of the lever 129 by the action of the compression spring interposed between the latch and the housing 5. When the projection 130 presses down on the lever 129, the end of the lever adjacent to the projection 132a is raised sufficiently for the projection 132a to engage under the lever. This automatically locks the element 129 (Fig. 4) intermediately pivoted at 129 and in actuated position for holding the switch 127 and the locking magnet circuit closed and the switch 128 and the elevating circuit open until the latch is retracted by energization of the latch magnet 133, as will be explained.

When the major load is applied, the contact 89 is disengaged and the relay deenergized; but a shunt switch 135 held open by the lower projection 126 when the rod is in raised position, is immediately biased to closed position when the control rod is lowered, and shunts the clutch relay contacts 115 to hold the clutch locked until the rod 117 is again returned to normal raised position and the clutch circuit is broken, the relay circuit having remained broken when the loading rod was lowered by the major load. The locking magnet 39 remains energized, after the control rod 117 is restored, until the latch 132 is retracted, to give time to take the gauge reading.

After the gauge 38 has been read, the foot-switch is released, completing a restoring circuit comprising conductors 137, 138, 139, 140, 98 connecting in series the normally engaged contact 82 of the foot lever, the brushes 76, 77, the lowering revolving magnets 56, the latch magnet 133, whereby when the foot lever is thus released to bias its movable element 84 to the unengaged contact 82, the lowering magnets 56 are energized, the screw lowered, and the latch magnet 133 releases the holding switch 126', opening the locking circuit 127', 122, 123, disconnecting the gauge 38. A trip switch 145 biased to closed position, interposed in conductor 137 of the lowering circuit is vertically adjustably clamped, by the clamping screw 146, passing through a slot 147 in the front wall 148 of the lower part of the housing, and is provided with a trip lever 149 engageable by the screw 11 when lowered, to open the circuit as soon as the screw is lowered to the predetermined required adjusted lower limit; after which the apparatus is in condition for another test.

Figure 1:
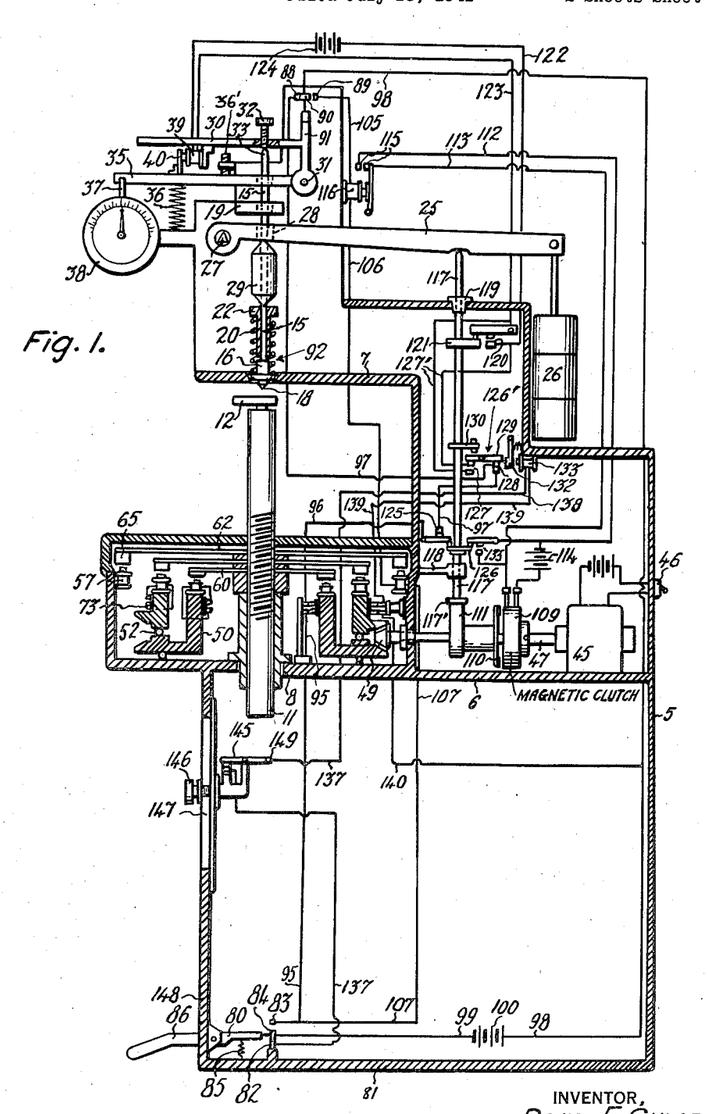
Fig. 1 is a partly diagrammatic vertical sectional view of the hardness tester.
Figure 2:
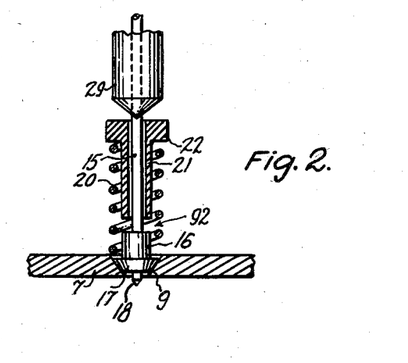
Fig. 2 is an enlarged vertical sectional view, partly in elevation showing details of the minor load and of parts of means for applying the major load.

Reference to Figs. 1 and 2 shows that the size of the gap 92 is considerable and greater than the normal size of the gap between contacts 120. Also since the distance from the knife edge fulcrum device 27 to the rod 117 is many times greater than the distance from the knife edge device to the gap 92, it follows that the gap at contacts 120 will close (thus energizing the magnet 39) well before the gap at 92 closes, thus giving a lengthy pause in the movement of the member 15 between the time when the screw 11 is first locked by the action of the locking magnets 57 and the time when the gap 92 is closed. Before this pause the indentor-member 15 is moving upwardly and after this pause the indentor member reverses and moves downwardly. It is during this pause that the closing of the switch 120 effects the operative connection between the gauge 38 and the indentor member. The movement of the major load lever starts when contact 89 is engaged, and some time later the switch 120 is closed. This gives full time for the indentor member to come to complete rest before being connected to the gauge, thus assuring a completely accurate zero position. After this complete rest and subsequent connection to the gauge, the gap 92 is closed and the major load then applied. After the major load has been completely applied and the lever 25 begins to rise, the gap 92 opens, allowing the indentor member to come to complete rest, after which the gauge will accurately indicate the increment of depth due to the increment of load.

Operation

The operation of the tester will be understood from the foregoing and now need be only summarized as follows:

The motor switch 46 is first closed to energize motor 45 which revolves bevel gear pinion 49 which is meshed with bevel gears 50 and 51, revolving them in opposite directions so the elevating nut 14 which has armatures 63, 64, 65 fastened to it can be rotated to either elevate or lower the screw 11. To make the test, the floor switch lever 86 is depressed moving the contact 84 to contact 83 closing the electrical circuit energizing revolving magnets 55, attracting and locking the armatures 63 to the magnets 55, rotating the nut 14, driving the screw 11 upward. This upward movement of the screw 11 continues, until the predetermined minor load is applied as determined by a standardized amount of spring compression; and incidentally a slight indentation is made in the specimen. The lever 30 then moves with the loading rod in which the indentor 18 is fastened and moves contact 90 away from contact 88, breaking the energized circuit for the coils of magnets 55, releasing the armatures 63. As soon as contact 90 leaves contact 88 it engages contact 89, closing the electrical circuit for the coils of the stationary brake-magnets 57, which attracts armatures 65 fastened to nut 14, locking the nut and screw 11 in position. Closing the contacts 89 and 90 also energizes the relay 116, as it is in the circuit of the coils of the brake magnets. The energizing of this relay 116 closes contacts 115 which shunt around switch 135, held open by the projection 126. Shunting the switch 135 closes the electrical circuit to the coil of the magnetic clutch 109 which is fast on the shaft 47 and revolves with it. This clutch attracts its armature 110 which is fastened to the cam 111 and causes the cam to revolve and the rod 117 on the cam follower 117' to move downward, lowering the weight 26 hung on the power lever 25, thereby to apply the major load to indentor 18, through the knife edge means 29, and seating collar 21, closing the gap 92 and pressing the collar on the seat of the cylindrical portion 16, which is a part of indentor loading rod, the gap 92 being necessary to keep the minor and major loads distinct and separate from each other. In this downward movement of rod 117, projections 121, 130 (Fig. 1) and 126 (Fig. 3), being rigidly fastened to the rod, follow down with it and operate contacts 120, 127, 128, 125 and 135. Contact 135 on closing keeps the magnet coil of clutch 109 energized for a single revolution, lowering and raising the major load 26. In this lowering of the major load, contact 90 moves back to contact 88; and to prevent the elevation of the specimen during the load-applying cycle, contacts 125 open as soon as the downward stroke starts, and contacts 128 latch open at the bottom of the stroke of rod 117, keeping the circuit of elevating coils 55 open.

The locking magnet 39 is energized as contacts 120 close with the downward movement of rod 117, thus causing lever 35 to follow lever 30 downward, moving the actuating member 37 and operating the indicating gauge 38 in unison with the movement of indentor rod 15. The lever 35 and indicating gauge are held in their proper index setting by spring 36 against the adjustable stop screw 36'. To keep the coil of magnet 39 energized after the rod 117 has again returned to its upward position and opened contacts 120, contacts 127 are shunted across contacts 120, as contacts 127 are latched in closed position at the lower limit of the rod travel. This keeps the magnet energized until the latch is later removed. This procedure automatically indicates on the gauge dial the increment in movement of the rod 15 caused by the addition of the major load, leaving the indicated measurement on the gauge dial as long as the operator keeps switch lever 86 depressed, thus giving the operator full time to take the reading.

To return the system to the starting position for another cycle of operation, it is only necessary to release pressure on switch lever 86, causing contact 84 to engage contact 82, which closes the electrical circuit for magnet coils 56 revolving in reverse direction to upward-driving coils 55. Coils 56 on being energized attract the armatures 64, revolving the nut 14 and driving the screw 11 downward until it depresses lever 149, opening the electrical circuit to coils 56, releasing the armatures 64, stopping rotation of the nut 14 causing the screw 11 to stop its downward movement. The switch is adjustably positioned to regulate the amount of downward movement of screw 11 to give the proper space between the top of screw 11 and the indentor 18 to suit the size of the particular specimens to be tested, and thereby reduce the time consumed in a complete test to a minimum for work of the size tested.

Release of pressure on the switch lever 86, causes contacts 82 and 84 to close. This energizes lowering coils 56 and also energizes latch magnet 133 which retracts the latch from holding lever 126' and restores contacts 127 and 128 to normal starting position. Opening contacts 127 to normal position causes magnet 39 to be de-energized, allowing the lever 35 and indicator gauge 38 to return to index or original position, while closing contacts 128 prepares the circuit of the upward driving coils 55 for the next cycle of operation.

The invention claimed is:

1. In a hardness tester, the combination of a housing frame having an upper seat opening; a bearing sleeve mounted in the frame below the seat opening; a screw in the sleeve adapted to receive the test piece on its upper end; an elevating nut receiving the screw and resting on the sleeve; a loading rod having an enlarged diameter seat portion normally in said seat opening, and having an indentor on the lower end; a minor load spring pressing on the seat portion; a major load lever adapted to be lowered; means pressed on by the lever and adapted to press on the seat portion when the lever is lowered; a control lever adjustably resting on the loading rod; an actuating lever mounted coaxially with the control lever; an indicating gauge mounted on the frame and having its actuating part connected to the actuating lever; a locking magnet and a flexibly mounted armature carried respectively on said control and actuating levers and adapted when the magnet is energized to lock the levers together; and means for energizing the magnet and means for lowering the major load.

2. A hardness tester comprising a test-specimen-support; a loading indentor-member pressed on by a minor load toward the support; a major load adapted when applied to press the member toward the support; an indicating gauge; electric means to operatively connect the gauge and member together; electrically controlled retracting means for the support; means to effect movement of the support toward the indentor member; a main-switch; a control switch operated by the loading member when moved by the specimen, and comprising a normally open contact; a relay; a circuit including the coil of said relay, the normally open control-switch contact and the operated main switch; electrically controlled applying means set in operation by the contacts of the relay when the relay is energized, to apply and retract the major load; a circuit including said electric means; a magnet-retracted latch means; switch means operated by applying movement of the major load and held by the latch, to close the said last named circuit; and a circuit closed by the main switch when released and including the retracting means and the latch means, to retract the latch when the test support is retracted.

3. A hardness tester comprising a test-specimen-support; a loading indentor-member pressed on by a minor load toward the support; a major load adapted when applied to press the member toward the support; an indicating gauge adapted to be operatively connected to the member; electrically controlled retracting and braking means for the support and drive means to drive the support toward the indentor member; a main-switch; a control switch operated by the loading member when moved by the specimen, and comprising normally closed and open contacts adapted respectively to be opened and closed when thus moved; a drive circuit including the drive means and the normally closed control contact and closed by the operated main switch; a relay; a braking circiut including the coil of said relay, the normally open control-switch contact, the braking means and the operated main switch; electrically controlled applying means set in operation by the contacts of the relay when the relay is energized, to apply and retract the major load; switch means operated by applying movement of the major load to open the drive circuit; a retracting circuit closed by the main switch when released and including the retracting means to retract the test support.

4. A hardness testing machine comprising an indentor member; a support therefor; a test-specimen-support opposed to the member; a minor load spring adapted to press the indentor member toward the test specimen; an indicating gauge adapted for operative connection with the member; drive means for moving the test-specimen-support toward the indentor member until the indentor member is pressed upon by the specimen and the indentor member is moved relative to its support against the pressure of the minor load thereby to apply the minor load; a major load; a major load applying means movable to apply and retract the major load to the member; means to disable the drive means after the minor load is applied with a predetermined pressure; brake means suddenly applying stopping force additional to the usual friction of the machine to accurately and suddenly stop and lock the specimen support stationary as soon as the drive means is disabled and when the minor load spring is at the desired compression; and means to set in operation the applying means to apply the major load while the specimen support is thus locked stationary.

5. A hardness testing machine comprising an indentor member; a support therefor; a test-specimen-support opposed to the member; a minor load spring adapted to press the indentor member toward the test specimen; an indicating gauge adapted for operative connection with the member; drive means for moving the test-specimen-support toward the indentor member until the indentor member is pressed upon by the specimen and moved against the pressure of the minor load thereby to apply the minor load; a major load; a major load applying means movable to apply the major load to the member; means set in operation by the movement of the indentor member when the minor load is applied to disable the drive means; means suddenly applying force additional to the usual friction of the machine and set in operation by movement of the member as the drive means is disabled to suddenly accurately stop the movement of the specimen support at a predetermined position with the spring at a predetermined pressure, and to lock the specimen support stationary at said position; and means then to set in operation the applying means to apply the major load while the specimen support is locked stationary.

6. A hardness tester comprising a housing frame having a seat; a bearing means mounted in the frame below the seat; a screw in the bearing means adapted to receive the test piece on its upper end; a nut receiving the screw and resting on the bearing means; a loading indentor member in said seat; means for at times rotating the nut; a set of braking magnets mounted on the housing coaxially of the screw; a set of armatures mounted on the nut coaxial with the screw and cooperative with the magnet set and adapted to be attracted and locked by the set; and a controlled circuit including the magnets for energizing the set to lock the nut.

7. A hardness tester comprising a housing frame having a seat; a bearing sleeve mounted in the frame below the seat; a screw in the sleeve adapted to receive the test piece on its upper end; a nut receiving the screw and resting on the sleeve; a loading indentor member in said seat; a ring gear mounted for rotation on the frame coaxially with the elevating screw; means for rotating the gear; a set of locking magnets mounted on the gear; flat springs mounted fast on the elevating nut and carrying a set of armatures coaxial with the screw and cooperative with the magnet set and adapted to be attracted and locked by the set; and a controlled circuit including the set of magnets for energizing the set to lock the armatures and move the screw longitudinally.

8. A hardness tester comprising a housing frame having a seat; a bearing means mounted in the frame below the seat; a nut of small diameter and inertia mounted for rotation on the bearing means; a screw in the nut adapted to receive the test piece on its upper end; a loading indentor member in said seat; a member mounted for rotation on the frame coaxially with the screw; means for constantly rotating the member; a set of locking magnets mounted on the member coaxially of the screw; a set of braking magnets mounted on the housing coaxially of the screw; springs mounted on the elevating nut and carrying sets of armatures coaxial with the screw and cooperative with the magnet sets respectively and adapted to be attracted and locked by the sets respectively; and separately controlled separate circuits including the respective sets of magnets for energizing the sets at different times to brake the nut or move the screw longitudinally.

9. A hardness tester comprising a housing frame having a seat; a bearing means mounted in the frame below the seat; a screw in the bearing means adapted to receive the test piece on its upper end; a nut receiving the screw and resting on the bearing means; a loading indentor member in said seat; annular members mounted for rotation on the frame coaxially with the elevating screw; means for rotating the members in opposite directions; sets of elevating and down-drive magnets mounted on the members respectively; springs mounted fast on the elevating nut and carrying sets of armatures coaxial with the screw and cooperative with the magnet sets respectively and adapted to be attracted and locked by and to the sets respectively; and separately controlled separate circuits including the respective sets of magnets for energizing the sets at different times to raise or lower the screw of the nut.

10. A tester as in claim 9, a set of braking magnets mounted on the housing coaxially of the screw; springs on the nut carrying armatures coaxial with the screw adapted to be locked by the braking magnets; and means to energize the braking magnets.

11. A hardness tester comprising an indentor member; a support therefor; a test-specimen-support opposed to the member; a minor load adapted to press the indentor member toward the test specimen; an indicating gauge normally disconnected from said member; means for effecting relative movement of the supports toward each other until the indentor member is pressed upon by the specimen and the indentor member is moved relative to its support against the pressure of the minor load; means set in operation by the movement of the indentor member when thus moved by the specimen to stop said approach; delayed means set in operation by the movement of the indentor member to operatively connect the member and gauge a while after said movement of the indentor member has ceased and while the member is stationary; a major load; a major load applying means set in operation by the movement of the indentor member to apply the major load to the member after the gauge has been operatively connected to the member.

12. A hardness tester comprising an indentor member; a support therefor; a test-specimen-support opposed to the member; a minor load adapted to press the indentor member toward the test specimen; an indicating gauge; the supports being adapted for relative approach toward each other until the indentor presses upon the test specimen and the indentor member is moved relative to its support thereby to apply the minor load; a major load; means set in operation by the movement of the indentor member when thus moved to stop said approach and movement; means set in operation by said movement of the indentor member to operatively connect the member and gauge a while after said approach and movement have stopped; and means set in operation by a port of said last named means to apply the major load a while after the member and gauge are connected.

13. A hardness tester comprising an indentor member; a support therefor; a test-specimen-support opposed to the member; a minor load adapted to press the indentor member toward the test specimen; an indicating gauge; the supports being adapted for relative approach toward each other until the indentor presses upon the test specimen and the indentor member is moved relative to its support thereby to apply the minor load; a major load; means set in operation by the movement of the indentor member when thus moved to stop said approach and movement; means set in operation by said movement of the member to apply the major load a while after said approach and movement have stopped; and means set in operation by said last named means to operatively connect the member and gauge a while after said approach and movement have stopped and a while before said major load is applied, whereby said member and gauge are connected while the member is at rest.

14. A hardness tester comprising an indentor member; a support therefor; a test-specimen-support opposed to the member; a minor load adapted to press the indentor member toward the test specimen; an indicating gauge; means for moving the test specimen support toward said member until the indentor presses upon the test specimen and the indentor member is moved relative to its support, thereby to apply the minor load; a major load; means set in operation by the movement of the indentor member when thus moved to stop said approach and movement; means set in operation by said movement of the member to operatively connect the member and gauge a while after said approach and movement have stopped; and means set in operation by a port of said last named means to apply the major load a while after the member and gauge are connected, and thereby reverse the movement of the indentor member; whereby the gauge and member are operatively connected during the pause of the indentor member just before the reversal.

15. A hardness tester comprising a housing frame having a seat opening; a support mounted in the frame below the seat and adapted to receive a test piece; a loading rod having an enlarged diameter seat portion normally in said seat opening, and having an indentor on the lower end; elevating means for raising said support until the test piece thereon engages and raises the loading rod; a minor load spring pressing the seat portion toward the seat opening; a seating collar resting on the spring and spaced above the seating portion to form a gap; a major load lever; an interposing piece adapted to be pressed on by the lever and to press on the seating collar when the lever is lowered; means set in operation by the movement of the loading rod when thus raised to stop and lock the elevating means; means set in operation by the loading rod when raised to lower the major load lever to close said gap and then apply the major load to the loading member; and means set in operation by the initial movement of said lever to operatively connect the rod and gauge a while after the elevating means is locked and before said gap is closed.

16. A hardness tester comprising a frame having a seat opening; a test-piece-support mounted in the frame below the seat; a loading rod having a seat portion normally in said seat opening and having an indentor on the lower end; elevating means for raising said support until the test piece engages and raises the loading rod; a minor load spring pressing down on the loading rod; a major load adapted when lowered to press on the rod; a control lever resting on the loading rod; an actuating lever mounted coaxially with the control lever; an indicating gauge mounted on the frame and having its actuating part connected to the actuating lever; a locking electric magnet and a flexibly mounted armature carried respectively on said control and actuating levers and adapted when the magnet is energized to lock the levers together; and means electrically connected to the coil of the magnet for energizing said magnet.

17. A hardness tester comprising a frame having a seat opening; a test-piece-support mounted in the frame below the seat; a loading rod having an enlarged seat portion normally in said seat opening, and having an indentor on the lower end; elevating means for raising said support until the test piece engages and raises the loading rod; a minor load spring pressing on the seat portion; a seating collar resting on the spring and spaced above the seating portion; a major load lever adapted to be lowered; means pressed on by the lever and adapted to press on the seating collar when the lever is lowered; a control lever adjustably resting on the loading rod; an actuating lever mounted coaxially with the control lever; an indicating gauge mounted on the frame and having its actuating part connected to the actuating lever; a locking magnet and a flexibly mounted armature carried respectively on said control and actuating levers and adapted when the magnet is energized to lock the levers together; means controlled by the loading rod when raised to stop and lock the elevating means and including major load lever lowering means to then lower the major load lever; a circuit including said magnet; a normally open switch in said circuit; and means operated by the major load lever lowering means, when lowering, to close said switch after the elevating means has been stopped and before the seating collar has engaged the seating portion; thereby to lock said levers together after the loading rod has become stationary and before the major load is applied.

18. A hardness tester comprising a test-specimen support; a minor load; a loading indentor-member pressed on by the minor load toward the support; a major load adapted when applied to press the member toward the support; an indicating gauge; electric means to operatively connect the gauge and member together; electrically controlled retracting means for the support; means to effect movement of the support toward the indentor member; a main-switch; a control switch operated by the loading member when moved by the specimen, and comprising a normally open contact; a circuit including the normally open control-switch contact and the operated main switch; electrically controlled applying means set in operation by said circuit when energized, to apply and retract the major load; a circuit including said electric means; a latch means; a retracting magnet for retracting the latch means; switch means operated by said applying means during the applying movement of the major load and held operated by the latch, to close the last named circuit; and a circuit closed by the main switch when released and including the retracting means and magnet, to retract the latch when the test support is retracted.

19. In a hardness tester, the combination of a test-specimen support; a loading indentor-member pressed on by a minor load toward the support; a major load adapted when applied to press the member toward the support; an indicating gauge adapted to be operatively connected to the member; electrically controlled retracting means for the support and drive means to drive the support toward the indentor member; a main-switch; a control switch operated by the loading member when moved by the specimen, and comprising normally closed and open contacts adapted respectively to be opened and closed by the loading member when thus moved; a drive circuit including the drive means and the normally closed control contact and closed by the operated main switch for moving the support toward the indentor member; a circuit including the normally open control-switch contact and the operated main switch; electrically controlled applying means interposed in said last named circuit to apply and retract the major load; switch means operated by applying movement of the applying means to open the drive circuit; and a retracting circuit closed by the main switch when released and including the retracting means to retract the test support.

20. A hardness tester comprising a test-specimen support; a loading indentor-member pressed by a minor load toward the support; a major load adapted when applied to press the member toward the support; an indicating gauge adapted to be operatively connected to the member; electrically controlled retracting means for the support; electrically controlled braking means for the support; electrically controlled drive means to drive the support toward the indentor member; a main-switch; a control switch operated by the loading member when moved by the specimen, and comprising normally closed and open contacts adapted respectively to be opened and closed by the loading member when thus moved; a drive circuit including the drive means and the normally closed control contact and closed by the operated main switch for moving the support toward the indentor member; a braking circuit including the normally open control-switch contact, the braking means and the operated main switch; electrically controlled applying means set in operation by the braking circuit to apply and retract the major load; switch means operated by applying movement of the applying means to open the drive circuit; and a retracting circuit closed by the main switch when released and including the retracting means to retract the test support.

21. A hardness tester as in claim 20 comprising a latch means adapted to hold said switch means in operated position; and a magnet in said retracting circuit adapted to unlatch the latch when the test support is retracted.

22. A hardness tester comprising a test-specimen support; a loading indentor-member pressed on by a minor load toward the support; a major load adapted when applied to press the member toward the support, an indicating gauge; electric means to operatively connect the gauge and member together; electrically controlled retracting means for the support; means to effect movement of the support toward the indentor member; a main-switch; a control switch operated by the loading member when moved by the specimen, and comprising a normally open contact; a relay; a circuit including the coil of the relay, the normally open control-switch contact and the operated main switch; electrically controlled applying means including a drive circuit therefor completed by the contacts of the relay when the relay is energized, to apply the major load; switch means operated by applying movement of the major load to hold the drive circuit of the applying means closed until the applying movement is complete; and a circuit closed by the main switch when released and including the retracting means to retract the test support.

23. A hardness tester comprising a loading-indentor-member; a test-specimen-support opposed to the member; a minor load pressing the member toward the support; a major load; an indicating gauge; actuating means for moving the support toward the loading member until the latter is moved by the test specimen; means set in operation by the movement of the loading member to disable the actuating means; means to apply and withdraw the major load to and from the loading member; locking means set in operation by the major load when applied to operatively connect the loading member and gauge; a latch means; holding means, operated by the major load when applied, held in operated position by the latch means, and adapted when operated to maintain the locking means operated and the actuating means disabled.

24. A tester as in claim 23 comprising means for releasing the latch means; means for effecting movement of the test support from the indentor-member; and unitary means for operating the last two named means.

25. A hardness tester comprising a test-specimen-support; a loading indentor-member pressed on by a minor load toward the support; a major load adapted when applied to press the member toward the support; an indicating gauge adapted to be operatively connected to the loading indentor-member; electrically controlled retracting means for retracting the support from the indentor member and drive means to drive the support toward the indentor member; a main-switch biased to a normal position; a drive circuit including the drive means and the operated main switch for moving the support toward the indentor member; applying means to apply and retract the major load; a retracting circuit closed by the main switch when released and including the retracting means to retract the test support.

26. A tester as in claim 25 including switch means operated by applying movement of the applying means to open the drive circuit.

27. A hardness tester comprising a housing frame having a seat; a bearing means below the seat; a screw in the bearing means adapted to receive the test piece; an elevating nut receiving the screw and resting on the bearing means; a loading rod having a seat portion normally in said seat; and having an indentor on the lower end; a minor load spring pressing downwardly on the rod; a major load means adapted to press downwardly on the rod; an indicating gauge having its actuating part adapted to be connected to the loading rod; a motor provided with a constantly rotary pinion; a pair of rotary ring gears coaxial with the elevating screw; said pinion meshing with the gears, for constantly rotating them in opposite directions; clutch means interposed between the gears respectively and the nut; and means for at times operating the respective clutch means.

28. A hardness tester comprising an indentor member; a support therefor; a test-specimen-support opposed to the member; a minor load adapted to press the indentor member toward the test specimen; an indicating guage; the supports being adapted for relative approach toward each other until the indentor presses upon the test specimen and effects movement of the indentor relative to its support, thereby to apply the minor load; means set in operation by said movement of the indentor member to stop said approach and movement; a major load and means set in operation by said movement to operatively connect the member and guage a while after said movement has stopped, and to apply the major load a while after the member and guage are connected.

29. In a hardness tester, the combination of an indentor member; a support therefor; a test-specimen-support opposed to the member; a load means adapted to press the indentor member toward the test specimen; an indicating guage;

the supports being adapted for relative approach toward each other until the indentor presses upon the test specimen and effects movement of the indentor relative to its support, thereby to apply a load; means set in operation by said movement of the indentor member when thus moved to stop said approach and movement; and means set in operation by said movement to operatively connect the member and guage a while after said movement has stopped, and while the indentor member is stationary.

30. A hardness tester comprising an indentor member; a support therefor; a test-specimen-support opposed to the member; a minor load adapted to press the indentor member toward the test specimen; an indicating guage; the supports being adapted for relative approach toward each other until the indentor presses upon the test specimen and effects movement of the indentor relative to its support, thereby to apply the minor load; means set in operation by said movement of the indentor member when thus moved to stop said approach and to effect a pause in said movement; means set in operation by said movement to operatively connect the member and guage during said pause and a while after said movement has stopped; and while the indentor member is stationary; a major load; and means set in operation by said movement to apply the major load after said pause and a while after the member and guage are connected.

31. A hardness tester comprising an indentor member; a support therefor; a test-specimen-support opposed to the member; a minor load adapted to press the indentor member toward the test specimen; an indicating guage; the supports being adapted for relative approach toward each other until the indentor presses upon the test specimen and effects movement of the indentor from its support, thereby to apply the minor load; a major load; means set in operation by said movement of the indentor member when thus moved to stop said approach and effect a pause in said movement; means set in operation by said movement to apply the major load and effect a reversal of said movement; and means set in operation by said movement to operatively connect the member and guage during said pause after said movement has stopped and before said reversal.

32. In a hardness tester, the combination of a frame having a seat; a loading rod having a seat portion normally in said seat and having an indentor on the lower end; a test-piece support mounted in the frame below the seat, and adapted to be raised until the test piece engages and raises the loading rod; a minor load means pressing down on the loading rod and adapted to apply a minor load as the loading rod is raised; a control lever; an actuating lever mounted coaxially with the control lever; an indicating guage mounted on the frame and having its actuating part connected to the actuating lever; a locking electro-magnet and a flexibly mounted armature carried respectively on said levers and adapted when the magnet is energized to lock the levers together; a source of current; and means adapted to connect said source to the coil of the magnet for energizing said magnet.

33. In a hardness tester, the combination of a frame having a seat; a loading rod having a seat portion normally in said seat and having an indentor on the lower end; a test-piece support mounted in the frame below the seat, adapted to be raised until the test piece engages and raises the loading rod; a control lever resting on the loading rod; an actuating lever mounted coaxially with the control lever; an indicating guage mounted on the frame and having its actuating part connected to the actuating lever; and a locking magnet and a flexibly mounted armature carried respectively on said levers and adapted when the magnet is energized to lock the levers together.

34. A hardness tester comprising an indentor member; a support therefor; a test specimen support opposed to the member; a minor load means adapted to press the indentor member toward the test specimen; an indicating guage adapted for operative connection with the member; drive means having a drive part engageable with the specimen support for moving the specimen support toward the indentor member until the indentor member is pressed upon by the specimen and moved against the pressure of the minor load means, thereby to apply the minor load; a major load; a major load applying means movable to apply the major load to the member; means set in operation by the movement of the indentor member to a predetermined position to disable the drive means; a fixed member; means set in operation by movement of the indentor member as the drive means is disabled to lock said part to said fixed member, thereby locking the specimen support stationary and to set in operation said applying means to apply the major load while the specimen support is thus locked stationary.

35. A hardness tester comprising an indentor member; a support therefor; a specimen-support opposed to the member; a minor load means adapted to press the indentor member toward the test specimen; an indicating guage adapted for operative connection with the member; drive means having a part engageable with the specimen support for moving the specimen-support toward the indentor member until the indentor member is pressed upon by the specimen and moved against the pressure of the minor load means, thereby to apply a minor load; power means for supplying power to said drive means; a major load; a major load applying means movable to apply the major load to the member; and means set in operation by the movement of the indentor member to a predetermined position to disconnect the power means from the drive means; means set in operation by movement of the indentor member as the drive means is disabled to substantially positively lock stationary all of the parts of said drive means that are disconnected from the power means, thereby locking the specimen support stationary, and at that time to set in operation said applying means.

36. A hardness testing machine comprising an indentor member; a support therefor; a specimen-support opposed to the member; a minor load means adapted to press the indentor member toward the test specimen; an indicating guage adapted for operative connection with the member; drive means having a part engageable with the specimen support for moving the test-specimen-support toward the indentor member until the indentor member is pressed upon by the specimen and moved against the pressure of the minor load means, thereby to apply a minor load; disabling means set in operation by the movement of the indentor member; when the specimen support reaches a predetermined position, when the minor load is applied, to disable the drive means; and means applying a force additional to the usual friction of the machine and set in operation by movement of the indentor member as the drive means is disabled, and while the specimen support is in said position, to stop and lock said part, thereby locking the specimen-support stationary substantially at said position.

37. A hardness tester comprising an indentor member; a support therefor; a specimen-support opposed to the member; a minor load means adapted to press the indentor member toward the test specimen; an indicating guage adapted for operative connection with the member; drive means having a part engageable with the specimen support for moving the specimen-support toward the indentor member until the indentor member is pressed upon by the specimen and moved against the pressure of the minor load, means thereby to apply a minor load; disabling means set in operation by the movement of the indentor member by the specimen to a predetermined position, when the minor load is applied, to disable the drive means; a fixed member; means set in operation by movement of the indentor member as the drive means is disabled to suddenly and instantaneously lock said part to said fixed member, thereby locking the speciment support stationary while said indentor member is substantially at said position; a major load; and means to apply the major load while the specimen support is thus locked stationary.

38. A hardness tester comprising a loading-indentor-member; a test-specimen-support opposed to the member; a minor load pressing the member toward the support; a major load; an indicating gauge; means for moving the support to the loading member until the latter is moved by the test specimen; major load applying means to apply and withdraw the major load to and from the loading member; locking means set in operation by the major load applying means when set in operation to operatively connect the loading member and gauge; holding means operated by the major load applying means when operated, and adapted when operated to maintain the locking means operated; and a latch means adapted to engage the holding means and hold the latter in operated position when said latter is operated.

39. A tester as in claim 38 comprising retracting means for effecting movement of the test support from the indentor-member; releasing means causing the latch means to release the holding means; and means for operating the retracting means and the releasing means.

40. A hardness tester comprising a loading-indentor-member; a test-specimen-support opposed to the member; a minor load pressing the member toward the support; a major load; an indicating gauge adapted to be operatively connected to the member; actuating means for moving the support toward the loading member until the latter is moved by the test specimen; means set in operation by the movement of the loading member to disable the actuating means; means to apply and withdraw the major load to and from the loading member; holding means operated by the major load applying means when operated and adapted when operated to maintain the actuating means disabled, and a latch means adapted to hold the holding means operated after it is operated.

41. A tester as in claim 40 comprising releasing means for releasing the latch means; retracting means for effecting movement of the test support from the indentor-member; and means for operating the releasing means and the retracting means.

42. A hardness tester comprising a test-specimen support; a loading indentor-member pressed by a minor load toward the support; a major load adapted when applied to press the indentor-member toward the support; an indicating gauge adapted to be operatively connected to the indentor-member; electrically controlled retracting means for retracting the support from the indentor-member; electrically controlled drive means to drive the support toward the indentor member; a main switch biased to a normal position; a drive circuit including the drive means and the operated main switch for operating the drive means for moving the support toward the indentor member when the main switch is operated; and a retracting circuit closed by the main switch when released to normal position and including the retracting means to retract the test support.

43. A tester as in claim 42 including applying means to apply and retract the major load; switch means operated by applying movement of the applying means to open the drive circuit.

44. A hardness tester comprising a test-speciment support; a loading indentor-member pressed by a minor load toward the support; a major load adapted when applied to press the indentor-member toward the support; an indicating gauge adapted to be operatively connected to the indentor member; electrically controlled retracting means for retracting the support from the indentor-member; electrically controlled drive means to drive the support toward the indentor member; a main-switch biased to a normal position; a drive circuit including the drive means and the operated main switch for operating the drive means for moving the support toward the indentor member when the main switch is operated; a retracting circuit closed by the main switch when released to normal position and including the retracting means to retract the test support; a normally closed switch interposed in said retracting circuit and adjustably mounted for adjustment toward and from the test-specimen support along the path of the support and having an actuating part engageable by the support during retracting movement of the support to open such switch and the retracting circuit to cause the retracting means to cease to retract.

45. A hardness tester comprising a housing frame having a seat; a bearing means below the seat; a screw in the bearing means adapted to receive a test piece; an elevating nut receiving the screw and resting on the bearing means; a loading rod having a seat portion normally in said seat; and having an indentor on the lower end; a pair of rotary ring gears coaxial with the elevating screw; a motor provided with a constantly rotary pinion; meshing with the gears, for constantly rotating them in opposite directions; a pair of clutch means respectively interposed between the nut and the respective gears; and means for at will operating one or the other or the respective clutch means.

DAVID F. SKLAR.